United States Patent [19]

Kinoshita

[11] Patent Number: 5,504,414
[45] Date of Patent: Apr. 2, 1996

[54] ELECTRIC SYSTEM FOR ELECTRIC VEHICLE

[75] Inventor: Shigenori Kinoshita, Kawasaki, Japan

[73] Assignee: Fuji Electric Co., Ltd., Kawasaki, Japan

[21] Appl. No.: 10,349

[22] Filed: Jan. 28, 1993

[30] Foreign Application Priority Data

| Jan. 31, 1992 | [JP] | Japan | 4-045901 |
| May 11, 1992 | [JP] | Japan | 4-144767 |
| Sep. 24, 1992 | [JP] | Japan | 4-279443 |

[51] Int. Cl.$^6$ ................................ H02J 7/10
[52] U.S. Cl. ................ 320/15; 320/28; 322/39
[58] Field of Search .............. 320/14, 21; 318/139; 307/46, 64, 66; 187/290, 289; 180/65.1, 65.3, 65.5, 65.8

[56] References Cited

U.S. PATENT DOCUMENTS

| 3,950,689 | 4/1976 | Jamison | 320/14 X |
| 4,065,711 | 12/1977 | Kawabata | 320/14 |
| 4,187,436 | 2/1980 | Etienne | 290/27 |
| 4,272,716 | 6/1981 | Etienne | 320/14 |
| 4,376,471 | 3/1983 | Uchino et al. | 187/29 R |
| 4,491,768 | 1/1985 | Slicker | 318/139 |
| 4,652,770 | 3/1987 | Kumano | 307/66 |
| 4,920,475 | 4/1990 | Rippel | 320/5 X |
| 5,185,536 | 2/1993 | Johnson, Jr. et al. | 307/66 |
| 5,229,650 | 7/1993 | Kita et al. | 307/66 |
| 5,350,994 | 9/1994 | Kinoshita et al. | 320/15 |

FOREIGN PATENT DOCUMENTS

| 59-061402 | 7/1984 | Japan . |
| 9301650 | 1/1993 | WIPO . |

OTHER PUBLICATIONS

Standard Handbook for Electrical Engineers Fink & Beaty, 11th edition. McGraw Hill.

*Primary Examiner*—Steven L. Stephan
*Assistant Examiner*—Nicholas Ponomarenko
*Attorney, Agent, or Firm*—Spencer & Frank

[57] ABSTRACT

An electric system for an electric vehicle enabling a secondary battery to be charged easily without using a large capacity and bulky charging system. The system can maintain integrity of power on a distribution network during charging. When charging the secondary battery, a switch connecting an inverter to an AC motor is opened, and then, the AC voltage from an external distribution network is supplied to the AC side of the inverter. The inverter rectifies the AC voltage to a DC voltage under the control of a control circuit so that the secondary battery is charged by the DC voltage. In another example, the windings of the AC motor may be connected between the distribution network and the inverter by the switching operation of a three-pole contactor so that the windings function as AC reactors.

17 Claims, 13 Drawing Sheets

FIG.5A  $v_M$  
FIG.5B  $i_M$  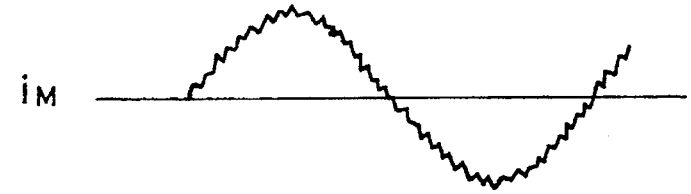
FIG.5C  $V_B$  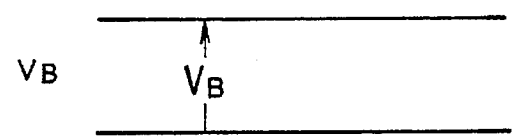
FIG.5D  $i_B$  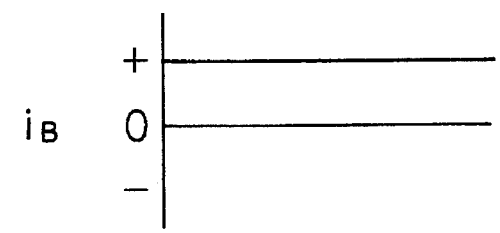

FIG.6A  $v_M$  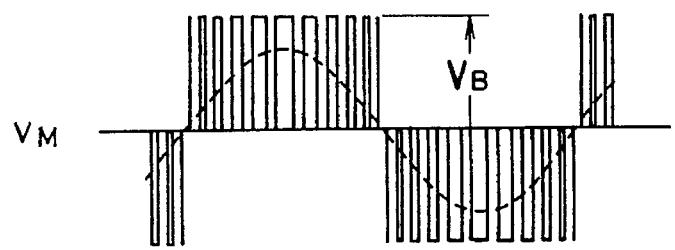
FIG.6B  $i_M$  
FIG.6C  $v_B$  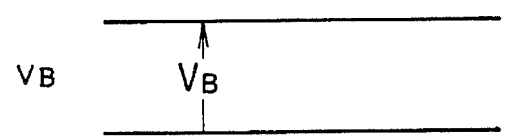
FIG.6D  $i_B$  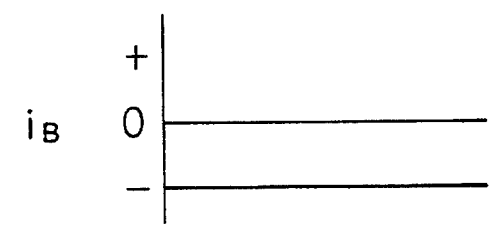

FIG.11A  $v_S$  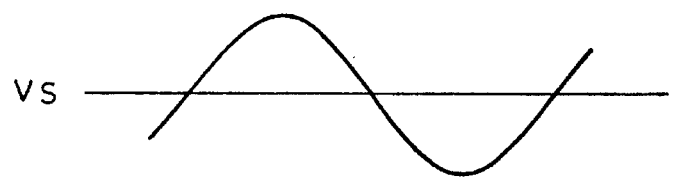
FIG.11B  $v_I$  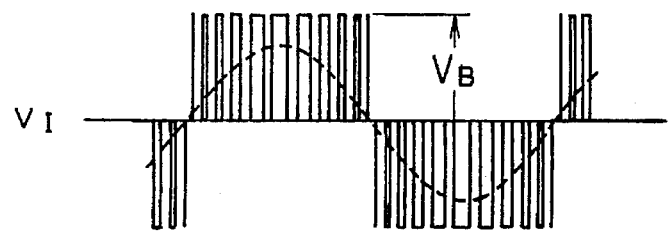
FIG.11C  $i_S$  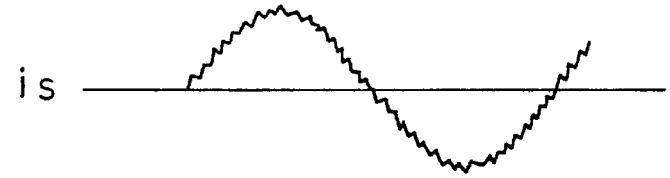
FIG.11D  $v_B$  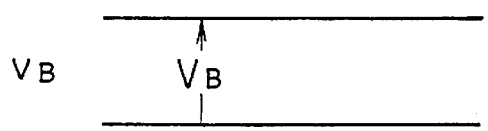
FIG.11E  $i_B$  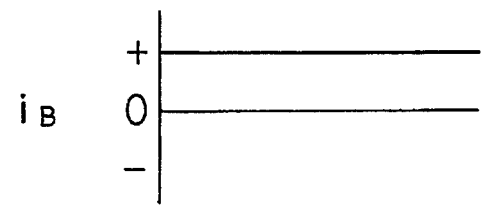

ELECTRIC SYSTEM FOR ELECTRIC VEHICLE

BACKGROUND OF THE INVENTION

1. Field of the Invention

The present invention relates to an electric system for an electric vehicle comprising a secondary battery as a power supply.

2. Description of the Related Art

FIG. 1 shows a power train for a conventional electric vehicle having a secondary battery as its power supply. Each of the wheels of the electric vehicle is driven separately by an AC motor.

In this figure, reference numeral 1 designates a secondary battery; 2, a main switch; 31 and 32, fuses; 41 and 42, three-phase inverters for use as a power converter having a regenerative function; 51 and 52, AC motors; 61 and 62, connecting wires connecting the inverters 41 and 42 and the AC motors 51 and 52, respectively; 71 and 72, reduction gears; and 81 and 82, wheels. The rotations of the AC motors 51 and 52 are reduced by the reduction gears 71 and 72, and are transmitted to the wheels 81 and 82.

FIG. 2 shows a power train which drives two wheels at the same time by one AC motor. In this figure, reference numeral 3 denotes a fuse; 4, an inverter; 5, an AC motor; 6, connecting wires; 7, a reduction gear; and 9, a differential gear. The other components are the same as those in FIG. 1.

In the drive systems in FIGS. 1 and 2, each of the inverters 41, 42 and 4 converts the DC power of the secondary battery 1 to the AC power so as to control the torque and the rotation rates of the AC motors 51, 52 and 5.

In the motoring mode of the electric vehicle, the power of the secondary battery 1 is DC-to-AC converted by the inverters, and is supplied to the motors from the inverters, thus driving the wheels. In contrast with this, in the regenerative braking mode, braking is performed by rectifying AC to DC by the inverters so that the kinetic energy of the electric vehicle is regenerated as the DC power to the secondary battery 1 via the wheels, motors and inverters.

FIG. 3 shows a three-phase transistor inverter employed as the inverters of the electric vehicle. Although the inverter 4 used in the drive system of FIG. 2 is explained in the description below, the inverters 41 and 42 in the drive system of FIG. 1 are similar.

In FIG. 3, reference numeral 401 denotes transistors, and 402 designates diodes, each of which is connected in antiparallel with each one of the transistors 401. The main circuit of the three-phase inverter comprises six arms each of which includes the transistor 401 and the diode 402. Reference numeral 403 denotes a capacitor for smoothing the current of the secondary battery 1.

FIGS. 5A–5D and 6A–6D illustrate the waveforms of the input and output currents and voltages of the inverter while driving the electric vehicle. Generally, inverters for driving an electric vehicle employ PWM (pulse width modulator) control like inverters employed for driving AC motors widely used in industry. The inverter 4 of FIG. 3 also uses PWM control. The voltages $V_M$, $V_B$ and the currents $i_M$, $i_B$ are identified in FIG. 4. FIGS. 5A–5D illustrate the voltage and current waveforms in the motoring mode, and FIGS. 6A–6D illustrate these waveforms in the regenerative braking mode. As seen from FIGS. 5A–5D and 6A–6D, the AC side voltage $V_M$ of the inverter 4 has a waveform obtained by performing the PWM control on the voltage $V_B$ of the secondary battery 1. This waveform is similar in both the motoring mode and the regenerative braking mode. The dotted curve shown in the waveform of the voltage $V_M$ indicates the fundamental wave of the PWM control. The PWM control performs such control as the fundamental wave becomes a sine-wave. The AC side current $i_M$ of the inverter 4 has a waveform in which a higher harmonic current is superimposed on the sinusoidal fundamental wave.

The waveforms shown in FIGS. 5A–5D and 6A–6D indicate that the power factor is 1.0 in this case. As shown in these figures, the phase of the current $i_M$ in the regenerative braking mode is opposite to that in the motoring mode so that the regenerative operation is performed. The current $i_B$ at the DC side of the inverter 4 is also reversed in the regenerative braking mode.

Since the stored energy in the secondary battery of the electric vehicle is limited, it must be charged at times, and this is essential in using the electric vehicle. In other words, the charging of the secondary battery and a charging system are essential in using the electric vehicle.

FIG. 7 shows a conventional charging system. In this figure, reference numeral 100 designates an electric vehicle comprising the same elements as shown in FIG. 2.

In FIG. 7, reference numeral 300 denotes a charging system which is connected to a charging connector 200 via charging cables 400 at the DC side, and to a connector 600 via cables 700 at the AC side. The charging connector 200 is connected to the secondary battery 1, and the connector 600 is connected to a distribution network 500.

When charging the secondary battery 1, the main switch 2 in the electric vehicle 100 is opened, and the secondary battery 1 is charged with the DC power supplied from the charging system 300 which rectifies the AC power supplied from the distribution network 500.

FIG. 8 illustrates a conventional charging system 300. In FIG. 8, reference numeral 301 designates a switch at the AC side of the system; 302, a step-down transformer provided as needed; 303, a rectifier made of diodes which rectifies an AC voltage into a DC voltage; 304, a chopper for controlling the charging current; 305, a reactor for smoothing the charging current; and 306, a fuse.

The charging system 300 is usually required to quickly charge the secondary battery 1 except when it is allowed to take enough time for charging. Accordingly, the capacity of the charging system must be at least equal to that of the inverter for driving the AC motor of the electric vehicle. Thus, since the charging system must have a large capacity and incorporate a power converter like the diode rectifier 303, the dimension of the charging system becomes large, and the charging operation requires a large amount of space.

FIG. 9 illustrates the charging operation of the electric vehicle 100.

It is essential to locate charging stations as shown in FIG. 9 at various sites such as gasoline stations for automobiles using internal combustion engines so that the electric vehicle can run without restriction of time and space.

In the conventional charging system, however, since the charging system 300 is bulky and expensive, it is difficult to locate it at many spots, and this presents a problem in increasing the use of electromobiles.

In addition, since the charging system 300 has a rectifying load which is to be connected to the distribution network 500, it induces higher harmonics on the distribution network 500, or reduces the power factor. This presents a problem in that the quality of the power supplied by the distribution network is deteriorated.

SUMMARY OF THE INVENTION

It is therefore an object of the present invention to provide an electric system for an electric vehicle which can charge its secondary battery by only connecting a simple apparatus to an AC power supply like a distribution network without using a bulky, expensive charging system.

It is another object of the present invention to provide an electric system which can maintain the integrity of the power on the distribution network during charging.

According to a first aspect of the present invention, there is provided an electric system for an electric vehicle comprising:

an AC motor for driving one or more wheels;

a secondary battery for supplying DC power;

power converting means for converting the DC power supplied from the secondary battery to AC power to be supplied to the AC motor, the power converting means having a regenerative function which rectifies AC power to DC power so that the DC power is regenerated to the secondary battery;

means for disconnecting a connection between the power converting means and the AC motor during charging of the secondary battery; and means for supplying an AC voltage to an AC side of the power converting means during the charging, wherein the power converting means rectifies the AC voltage applied to the AC side thereof to a DC voltage during charging so that the secondary battery is charged by the DC voltage.

Here, the power converting means may be an inverter which carries out PWM control during charging of the secondary battery.

The AC motor, the power converting means, the means for disconnecting and the means for supplying may be of three-phase devices.

The AC motor and the power converting means may be of three-phase devices, whereas the means for disconnecting and the means for supplying may be single-phase devices.

An electric system for an electric vehicle may further comprise a reactor provided between the means for supplying and the power converting means.

An electric system for an electric vehicle may further comprise a step-down transformer inserted between the means for supplying and the power converting means.

The peak value of the output voltage of the step-down transformer may be set lower than the DC voltage applied to the secondary battery.

An electric system for an electric vehicle may further comprise a fuse inserted between the means for supplying and the power converting means.

According to a second aspect of the present invention, there is provided an electric system for an electric vehicle comprising:

an AC motor for driving one or more wheels;

a secondary battery for supplying DC power;

power converting means for converting the DC power supplied from the secondary battery to AC power to be supplied to the AC motor, the power converting means having a regenerative function which rectifies the AC power to DC power so that the DC power is regenerated to the secondary battery;

means for supplying an AC voltage to an AC side of the power converting means during charging; and means for connecting windings of the AC motor in such a fashion that the windings are inserted between the means for supplying and the power converting means during the charging, wherein the power converting means rectifies the AC voltage applied to the AC side thereof to a DC voltage during charging so that the secondary battery is charged by the DC voltage.

Here, the means for connecting may comprise a switch for switching the windings of the AC motor in such a fashion that the windings are inserted between the means for supplying and the power converting means during the charging, and take a normal motor winding configuration during driving of the wheels.

The AC motor may be of three-phase devices, and the windings of the AC motor may be star-connected during driving of the wheels.

The AC motor may be of three-phase devices, and the windings of the AC motor may be delta-connected during driving of the wheels.

An electric system for an electric vehicle may further comprise means for operating the switch automatically when starting the charging of the secondary battery.

The power converting system may be an inverter which carries out PWM control during charging of the secondary battery.

The AC motor, the power converting means, the means for connecting and the means for supplying may be of three-phase devices.

The AC motor and the power converting means may be of three-phase devices, whereas the means for connecting and the means for supplying may be of single-phase devices.

An electric system for an electric vehicle may further comprise a step-down transformer inserted between the means for supplying and the power converting means.

The peak value of the output voltage of the stepdown transformer may be set lower than the DC voltage applied to the secondary battery.

An electric system for an electric vehicle may further comprise a fuse inserted between the means for supplying and the power converting means.

An electric system for an electric vehicle may further comprise a brake for braking the wheels of the electric vehicle.

According to the first aspect of the present invention, the power converting means like an inverter is disconnected from the AC motor during charging of the secondary battery, and the power supplying means like a distribution network is connected to the AC side of the power converting means. The power converting means operates in a conventional regenerative braking mode wherein AC-to-DC conversion is performed so that the secondary battery is charged with DC power.

Thus, since no bulky charging apparatus is required incorporating a rectifier such as a diode rectifier, chopper or the like, a low cost, small, space-saving electric system can be realized.

Furthermore, the PWM control performed during charging will reduce higher harmonics and distortion, enable the operation with a power factor of 1.0, and maintain the quality of the distribution network.

In addition, since both single- and three-phase power supplies can be employed, both household power supplies and factory power supplies can be used for charging.

According to the second aspect of the present invention, the AC side of the power converting means like an inverter is connected to the power supplying means like a distribution network via the windings of the AC motor during charging of the secondary battery. Thus, the power converting means operates as in the conventional regenerative braking mode in order to charge the secondary battery.

The windings of the AC motor connected between the power converting means and the power supplying means function as a reactance which greatly reduces the higher harmonics generated by the PWM control or the like of the power converting means. Thus, the integrity of the current waveforms of the power supplying means is maintained.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 5A–5D illustrate waveforms of input and output voltages and currents of the inverter as shown in FIG. 3 when the inverter is operated in the motoring mode;

FIGS. 6A–6D illustrate waveforms of input and output voltages and currents of the inverter as shown in FIG. 3 when the inverter is operated in the regenerative braking mode;

FIGS. 11A–11E illustrate waveforms of voltages and currents of some portions of the electric system of FIG. 10 during charging;

DETAILED DESCRIPTION OF PREFERRED EMBODIMENTS

The invention will now be described with reference to the accompanying drawings.

Figure 1:
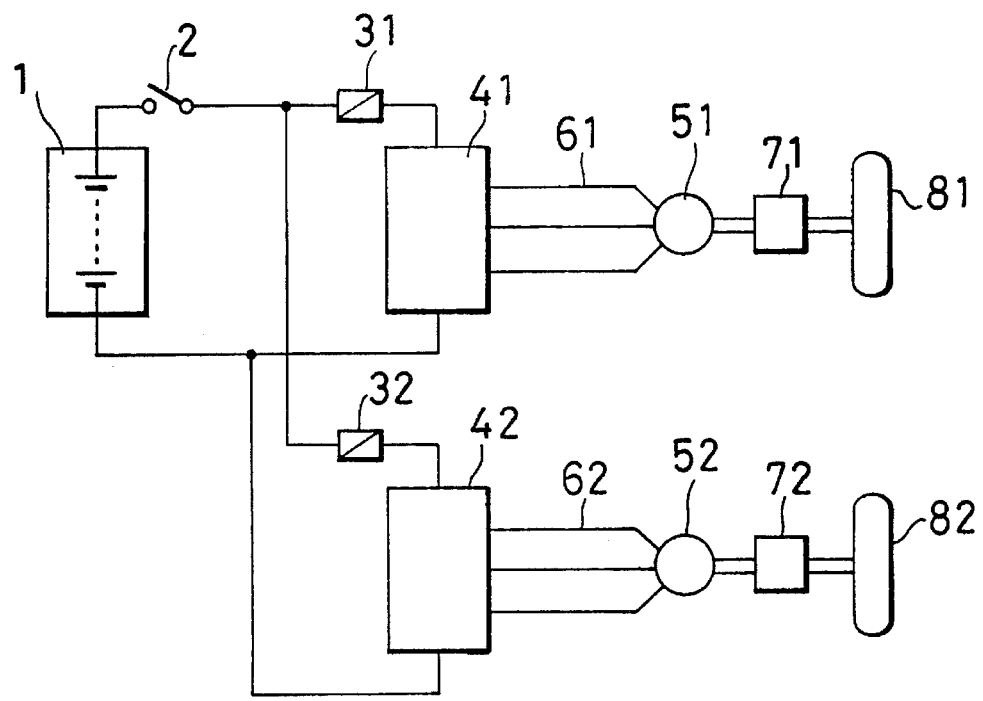
FIG. 1 is a block diagram showing a power train for a conventional electric vehicle.
Figure 2:
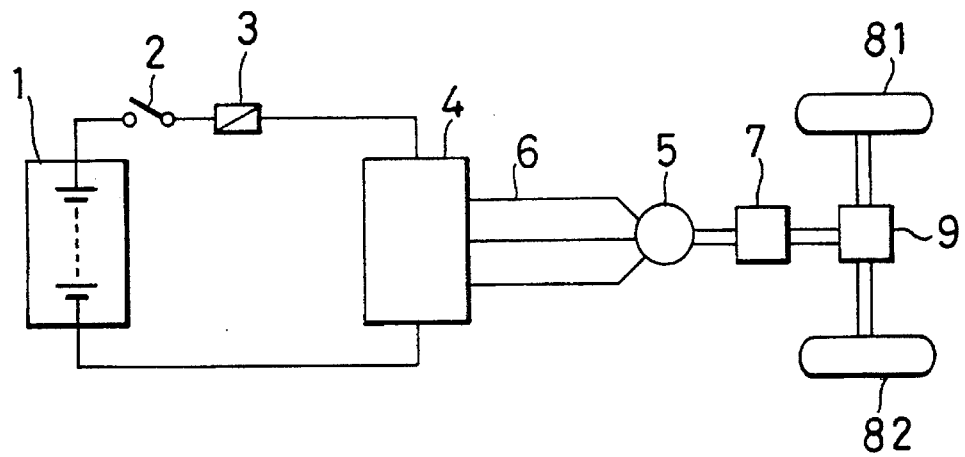
FIG. 2 is a block diagram showing another power train for a conventional electric vehicle.
Figure 3:
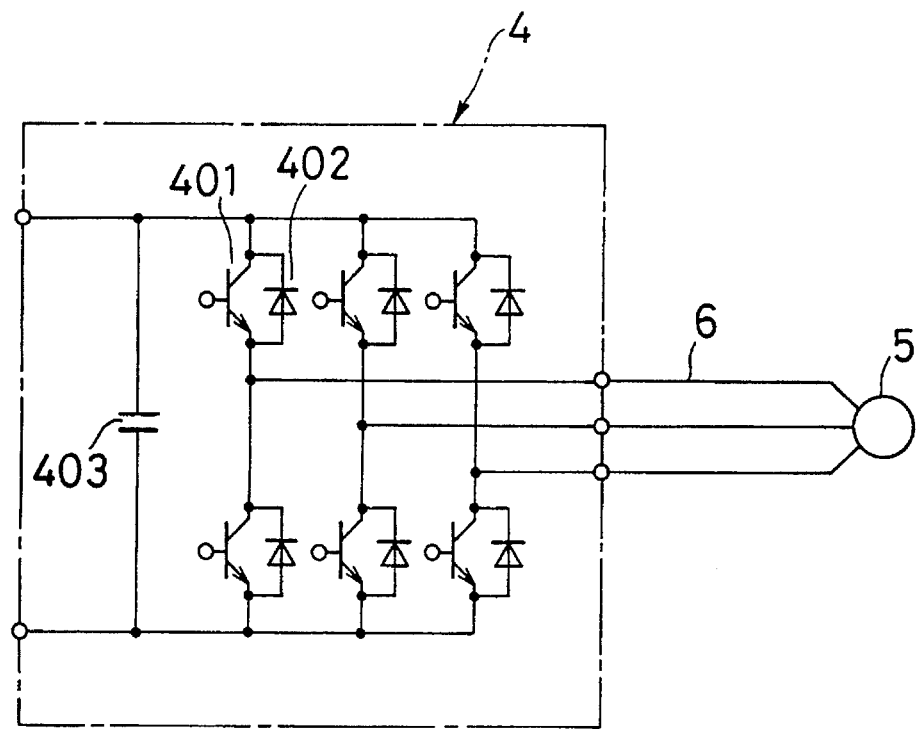
FIG. 3 is a circuit diagram showing a main circuit of a three-phase transistor inverter.
Figure 10:
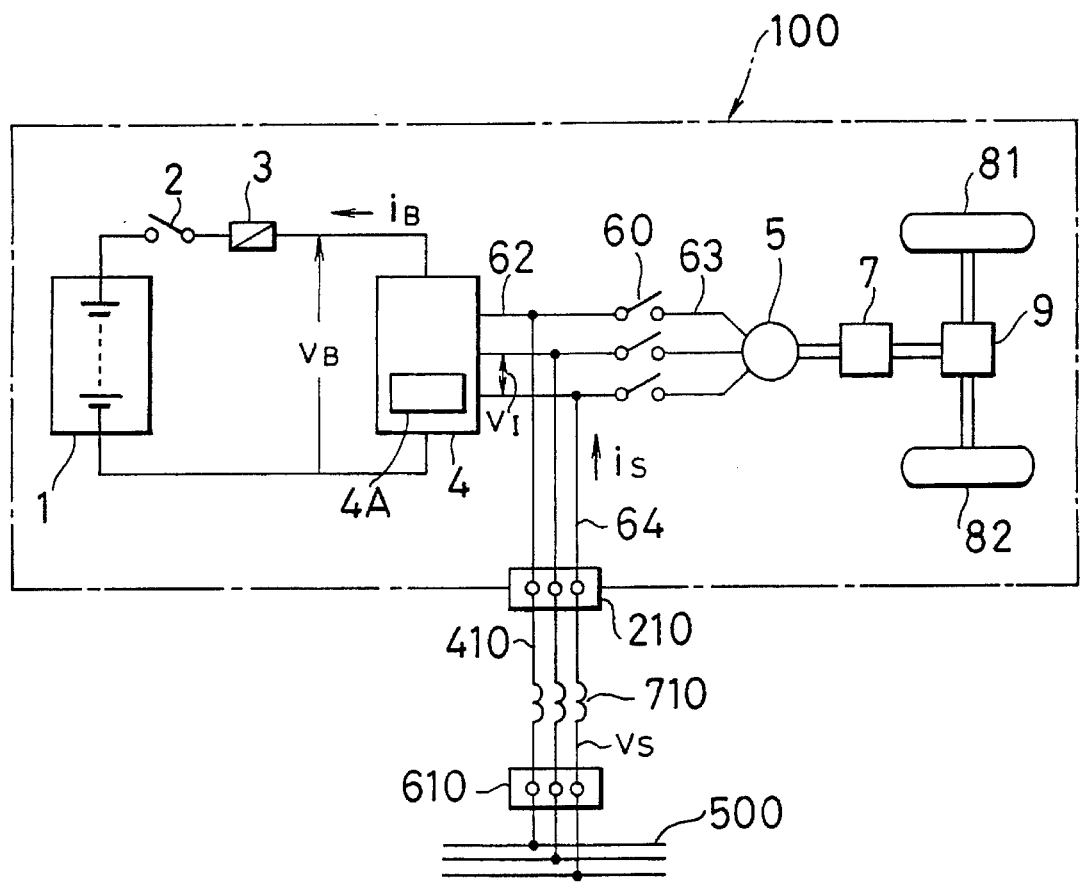
FIG. 10 is a block diagram showing the arrangement of a first embodiment of an electric system for an electric vehicle in accordance with the present invention.

FIG. 10 shows the arrangement of a first embodiment of the present invention. In this figure, the same reference numerals designate the same or corresponding elements in FIG. 2, and the description thereof is omitted here.

In the electric vehicle 100 of this embodiment, the inverter 4 executes both rectifying and inverting operations. AC connecting wires 62 of the inverter 4 are connected to motor connecting wires 63 via a switch 60. In addition, the connecting wires 62 are also connected to a charging AC connector or terminals 210 (both AC connector and terminals are referred to as an AC connector below for the purpose of simplicity) by way of connecting wires 64.

And, as an external AC power supply, an AC connector or terminals 610 (both AC connector and terminals are called an AC connector like the AC connector 210) is connected to a three-phase distribution network 500. When the secondary battery 1 of the electric vehicle 100 is being charged, charging cables 410 including AC reactors 710 are connected between the AC connectors 210 and 610. Here, the AC reactors 710 can be removed when the distribution network 500 includes a certain amount of reactance.

The switch 60 is closed when the secondary battery 1 of the electric vehicle is not being charged so that the AC power outputted from the inverter 4 is supplied to an AC motor 5 so as to drive it. On the other hand, when the charging cables 410 are connected to the AC connector 210 to charge the secondary battery 1, the switch 60 is automatically opened by a suitable mechanism not shown so that the voltage on the distribution network 500 is not directly applied to the AC motor 5.

The inverter 4 further comprises a control circuit 4A so as to control its operation.

Next, the charging operation in accordance with this embodiment will be described with reference to FIGS. 11A–11E. As described above, the secondary battery 1 of the electric vehicle 100 is connected to the distribution network 500 via the inverter 4, connecting wires 62 and 64, the AC connector 210, the charging cables 410, and the connector 610, and then, a main switch 2 is closed. Then, the control of the inverter 4 is manually switched from a motor control mode (corresponding to the motoring mode) to a charging control mode (corresponding to the regenerative braking mode)so that the AC to DC conversion is performed under the PWM control in such a manner that the charging current and voltage to the secondary battery 1 are regulated to preset values.

Figure 4:
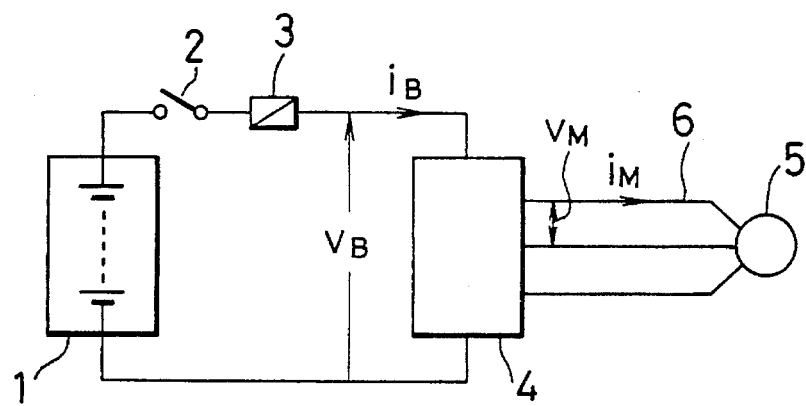
FIG. 4 is a block diagram showing a major portion of the power train shown in FIG. 2.
Figure 7:
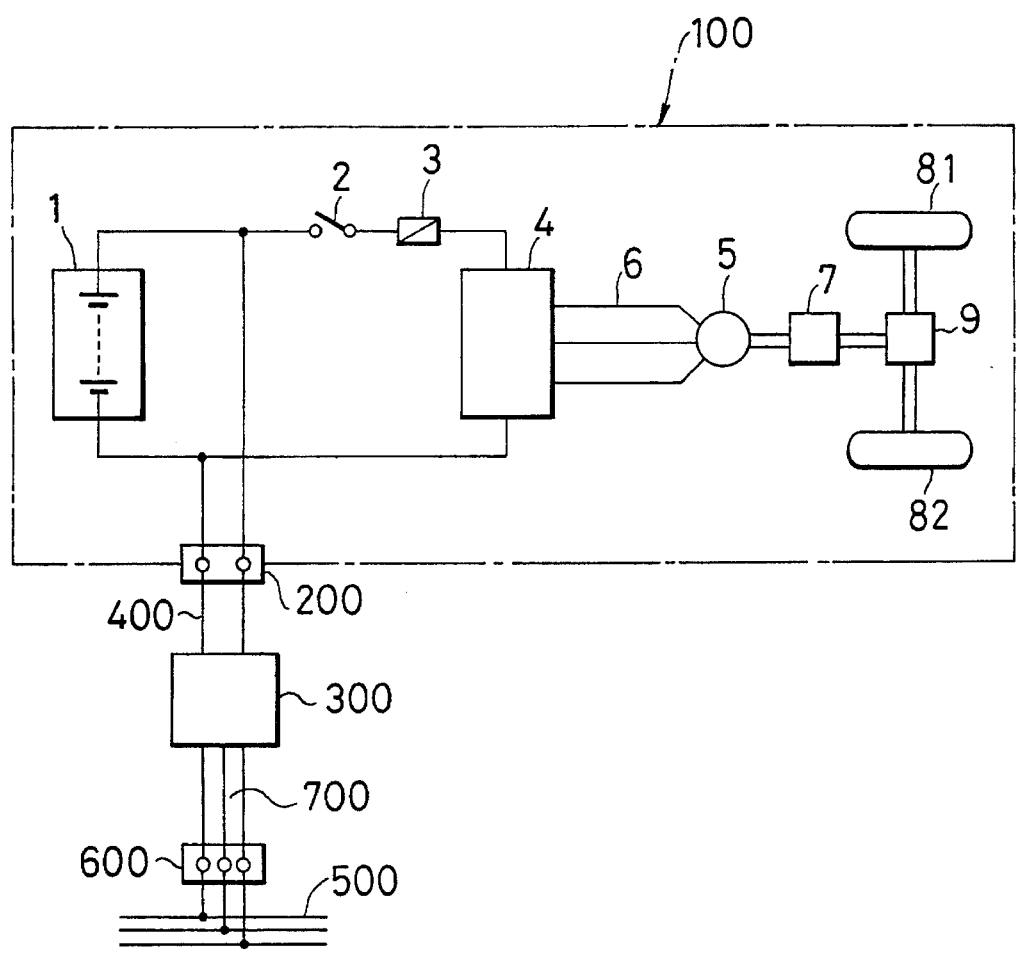
FIG. 7 is a block diagram showing an arrangement of a conventional charging system.
Figure 8:
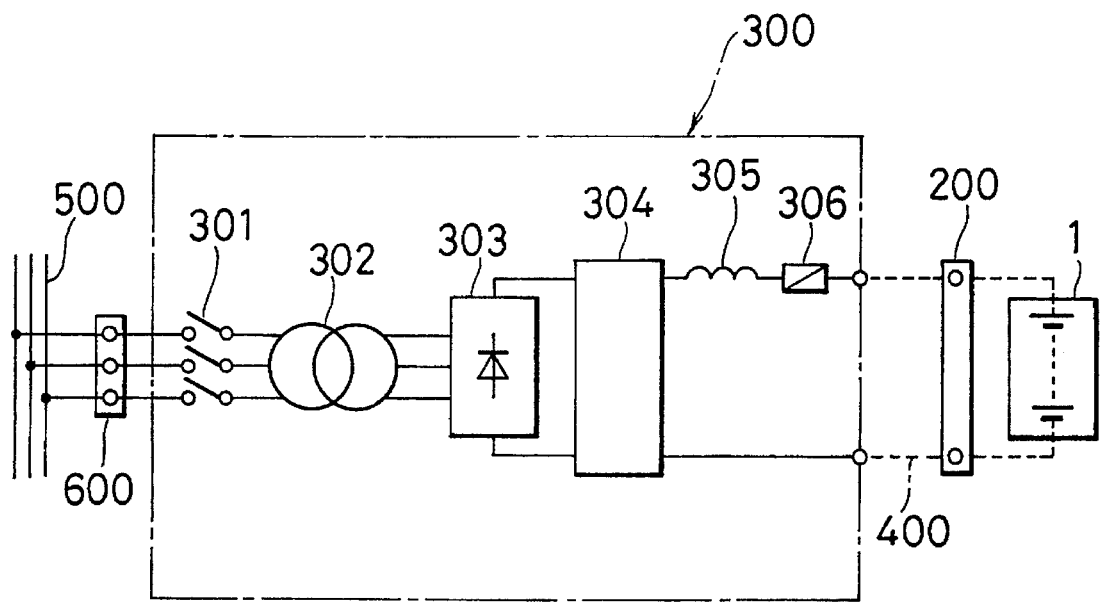
FIG. 8 is a block diagram showing an arrangement of another conventional charging system.
Figure 9:
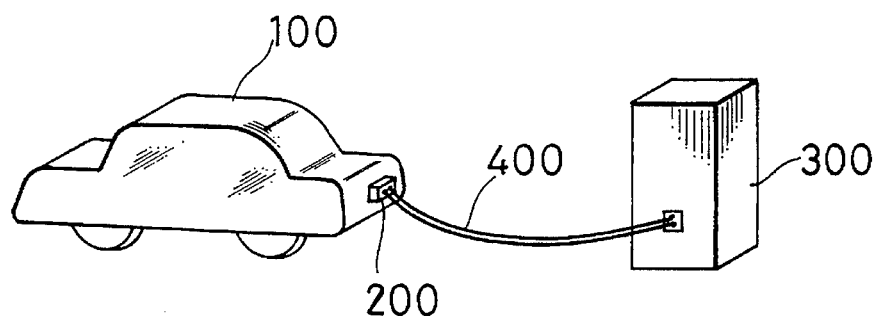
FIG. 9 is a diagram illustrating a conventional charging system.

FIGS. 11A–11E illustrate the voltages and currents of some portions of the inverter 4 when it is in the charging mode. The voltages and currents are substantially equivalent to those in FIGS. 6A–6D which illustrate the regenerative braking operation. It must be noted here that the directions of currents $i_R$ are reversed in this case, as seen by comparing FIG. 4 and FIG. 10.

In the charging mode, it is preferable that the voltage of the secondary battery 1 be higher than the peak value of the sine-wave AC voltage on the distribution network 500. Although the voltage of the secondary battery 1 may be slightly lower than the peak value of the AC voltage because the charging current is limited by the internal resistance of the battery and therefore would not become excessive in this case, a lower voltage will cause a charging current that cannot be controlled by the diodes constituting the inverter 4 so that an overcurrent might blow the fuse 3, thereby opening the charging circuit.

In accordance with this embodiment, the inverter 4 which has not been conventionally used to charge the battery is utilized as the AC to DC converter so that the DC output thereof is used to charge the secondary battery 1.

Accordingly, from the viewpoint of the total system for charging the battery, it is enough for the electric vehicle 100 to further comprise the switch 60, the connecting wires 64, the AC connector 210, and the charging control circuit 4A in the inverter 4 which is also needed conventionally, and for the AC power line to further comprise the AC connector 610, and the AC reactors 710 when required, in addition to the cables 410 which are also needed conventionally. As a result, this embodiment can realize a very low cost and a space-saving charging system.

Moreover, by carrying out the PWM control of the inverter 4, the current is supplied from the distribution network 500 to the electric vehicle 100 during the charging operation can take a nearly complete sinusoidal waveform with small distortion as shown in FIG. 11C. This makes it possible to accomplish the charging operation whose power factor is 1.0. This will also ensure that the quality of the power on the distribution network 500 is maintained.

EMBODIMENT 2

Figure 12:
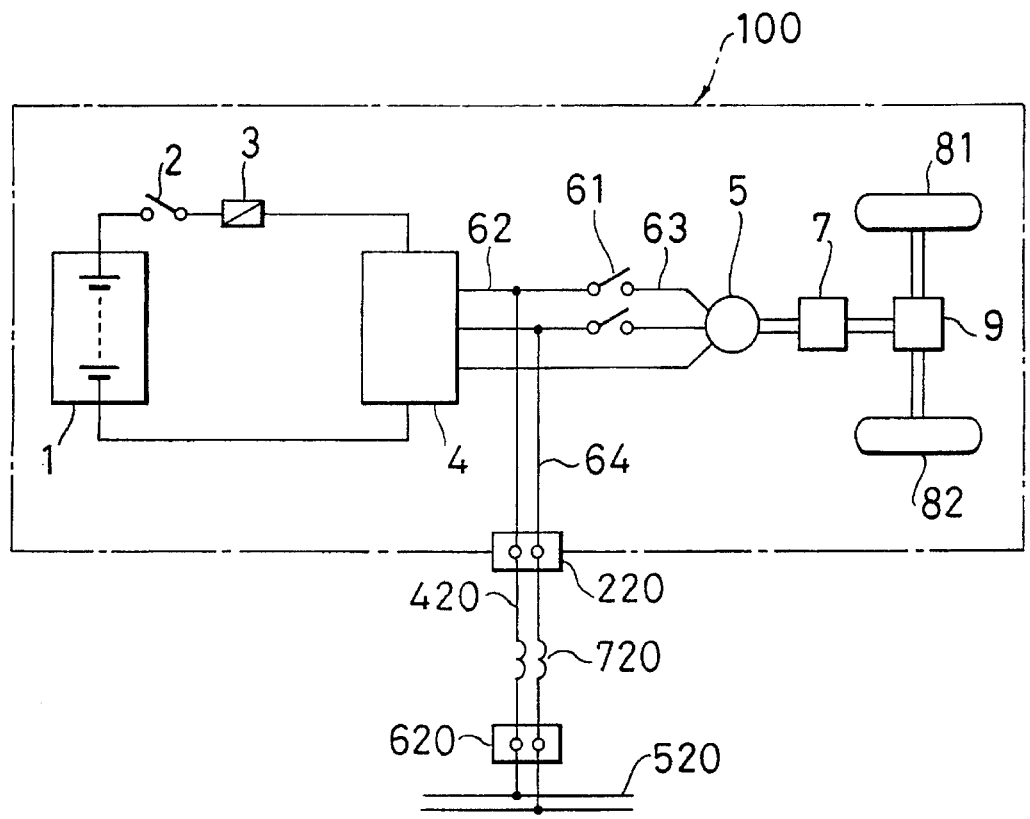
FIG. 12 is a block diagram showing the arrangement of a second embodiment of an electric system for an electric vehicle in accordance with the present invention.

FIG. 12 show a second embodiment of the present invention. This embodiment is applied to a single-phase distribution network 520. In connection with this, AC connectors 220 and 620 (the AC connector refers to the AC connector and terminals that may be used in place of the AC connector as mentioned before), charging cables 420, AC reactors 720 when needed, connecting wires 64 and a switch 61 are all constructed in accordance with single-phase specifications.

The inverter 4 and the AC motor 5 are, on the other hand, based on three-phase specifications so that a single inverter can deal with charges from the single-phase and three-phase distribution networks 520 and 500 by switching the single-phase/three-phase control of the inverter 4.

EMBODIMENT 3

Figure 13:
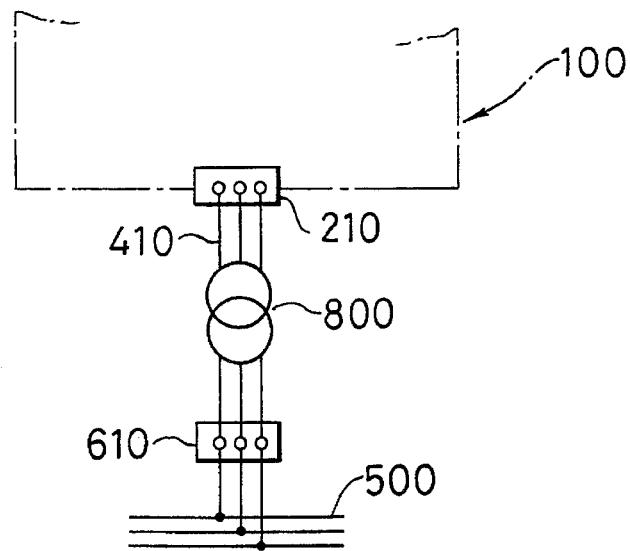
FIG. 13 is a block diagram showing the main portion of a third embodiment of an electric system for an electric vehicle in accordance with the present invention.

FIG. 13 shows the main portion of a third embodiment of the present invention. It comprises a step-down transformer 800 inserted instead of the AC reactors 710 and 720 of the embodiments shown in FIGS. 10 and 12. Although the system in FIG. 13 is applied to the three-phase distribution network 500, it can also be applied to a single-phase distribution network 520 as shown in FIG. 12.

This embodiment is effective because of the following reasons: first, the windings of the step-down transformer 800 ensure some amount of reactances at the AC side of the inverter 4; and second, the step-down transformer 800 enables supply to the AC side of the inverter 4 with a lower AC voltage than the voltage of the secondary battery 1 even if the battery voltage is lower than the peak value of the AC voltage on the distribution network 500.

The above-described embodiments may comprise fuses between the electric vehicle and the distribution network for protecting the devices of the inverter 4 from an overcurrent at the AC side of the inverter 4. The fuses may be serially connected with the AC reactors 710 or 720, or with the step-down transformer 800. In addition, an AC switch may be connected between the electric vehicle and the distribution network for the purpose of safety.

Next, fourth and fifth embodiments of the present invention will be described. These embodiments comprise the windings of the AC motor connected between the inverter and the AC power supply, and while the secondary battery is charged to operate the windings as a reactors. These embodiments are characterized in that they comprise a switch for switching the connection of the windings in accordance with the driving of the wheels by the AC motor, or the charging of the secondary battery.

EMBODIMENT 4

Figure 14:
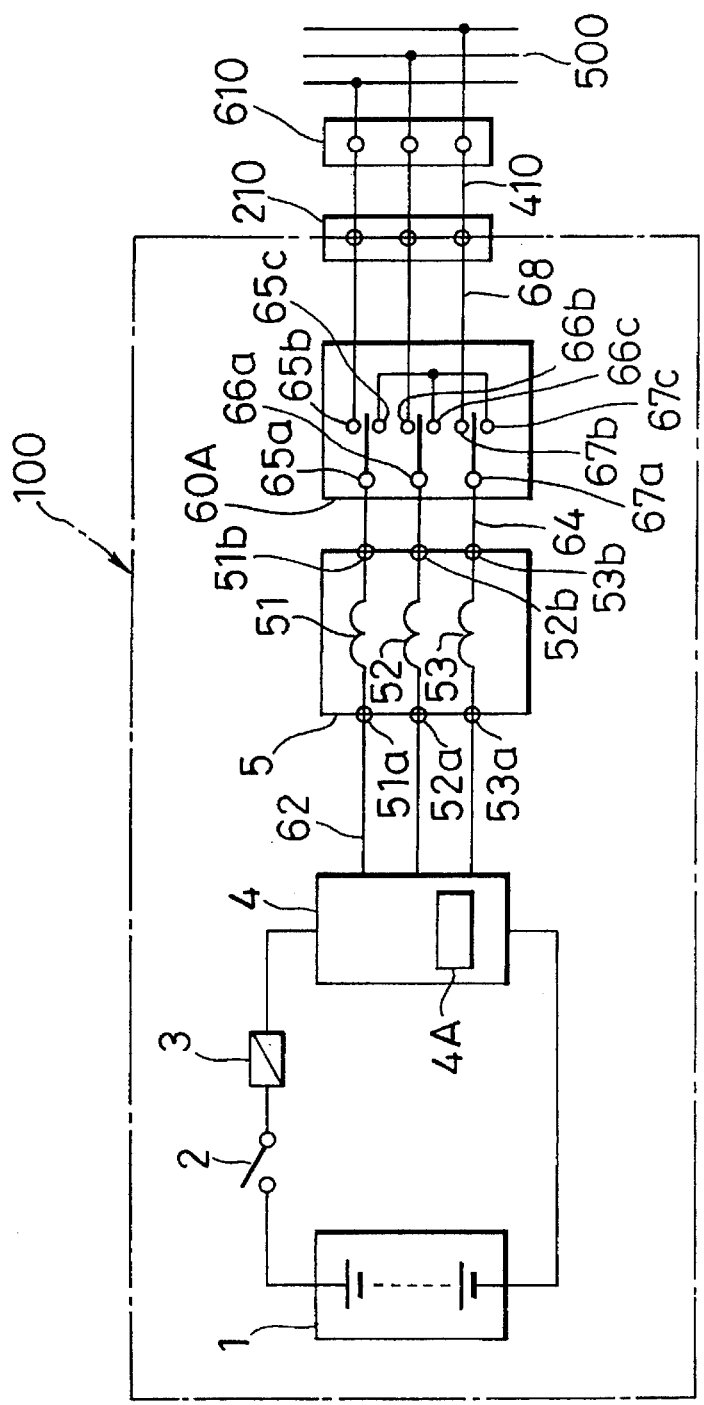
FIG. 14 is a block diagram showing the arrangement of a fourth embodiment of an electric system for an electric vehicle in accordance with the present invention.

FIG. 14 shows an arrangement of the fourth embodiment of the present invention. In this figure, like or corresponding elements are designated by the same reference numerals as in FIG. 10, and the description thereof is omitted here.

In the electric vehicle 100 of FIG. 14, the connecting lines 62 at the AC side of the inverter 4 are connected to first terminals 51a, 52a and 53a of the phase-windings 51, 52 and 53 of the AC motor 5, respectively. On the other hand, second terminals 51b, 52b and 53b of the phase-windings 51, 52 and 53 are connected, via the connecting wires 64, to first terminals 65a, 66a and 67a of a three-pole switch 60A, respectively. Second terminals 65b, 66b and 67b of the three-pole switch 60A are connected to the AC connector 210 via the connecting wires 68. The remaining third terminals 65c, 66c and 67c of the three-pole switch 60A are connected with each other.

And, the external three-phase distribution network 500 is connected to the AC connector 610 as mentioned before. When the secondary battery 1 of the electric vehicle 100 is being charged, the charging cables 410 are connected between the AC connectors 210 and 610.

This embodiment employs a three-phase induction motor as the AC motor, and the windings thereof are star-connected (Y-connected).

Next, the operation of the fourth embodiment will be described below.

When the AC motor 5 operates to drive the wheels, the terminals 65a, 66a and 67a of the three-pole switch 60A are connected to the terminals 65c, 66c and 67c thereof so that the windings 51, 52 and 53 are star-connected. By this, the windings 51, 52 and 53 are disconnected from the AC connector 210 and the distribution network 500 so that the motor 5 can operate as an AC motor.

Figure 15:
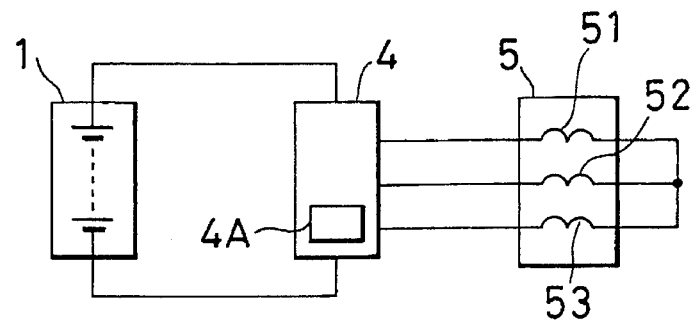
FIG. 15 is a block diagram showing the connection of the windings of the AC motor when the AC motor drives the wheels in the fourth embodiment shown in FIG. 14.

FIG. 15 shows the connection in this case. As described above, the windings 51, 52 and 53 are star-connected in the motoring mode, and hence, the AC motor 5 is driven by the AC power supplied from the inverter 4. In contrast, in the regenerative braking mode, the inverter 4 performs the power conversion opposite to that in the motoring mode so that the power is regenerated to the secondary battery 1 through the inverter 4.

On the other hand, when the secondary battery 1 is charged, the terminals 65a, 66a and 67a of the three-pole switch 60A are connected to the terminals 65b, 66b and 67b thereof so that the windings 51, 52 and 53 are connected to the distribution network 500 via the AC connectors 210 and 610.

Figure 16:
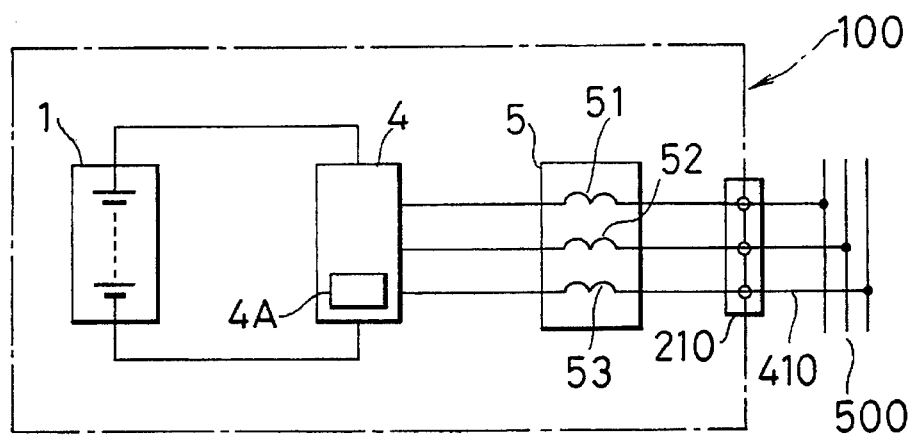
FIG. 16 is a block diagram showing the connection of the windings of the AC motor when the secondary battery is charged through the windings in the fourth embodiment shown in FIG. 14.

FIG. 16 shows the connection in this case. The windings 51, 52 and 53 function in the same manner as the AC reactors 710 in FIG. 10 or the AC reactors 720 in FIG. 12. The charging power is supplied from the distribution network 500 to the inverter 4 by way of the windings 51, 52 and 53, and the inverter 4 converts the AC power into the DC power so that the secondary battery 1 is charged in the same manner as in the regenerative braking mode.

For this purpose, the inverter 4 comprises a control circuit 4A for controlling the charging operation.

Figure 17:
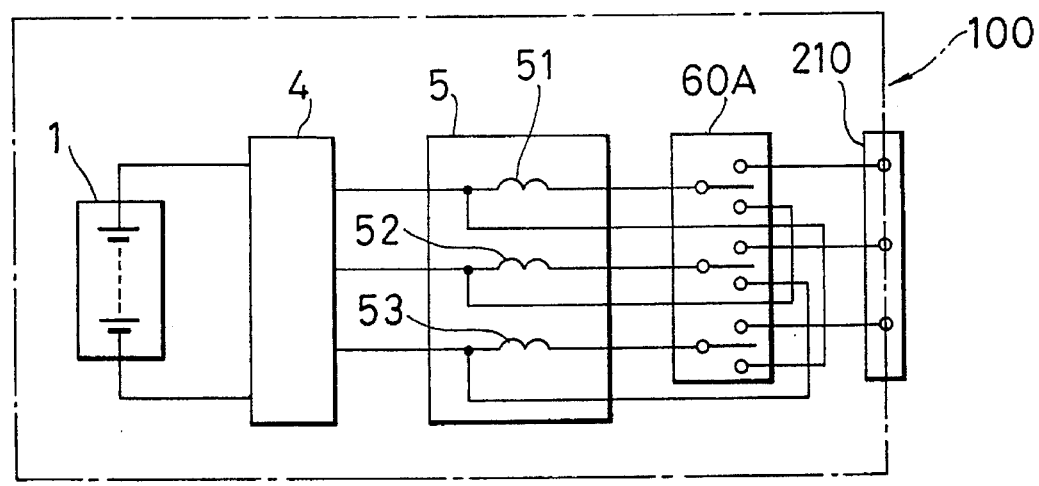
FIG. 17 is a block diagram showing the main portion of a fifth embodiment of the present invention.

FIG. 17 shows the fifth embodiment of the present invention. In this embodiment, the windings 51, 52 and 53 of the AC motor 5 are delta-connected. The fifth embodiment differs from the fourth embodiment in the connection between the windings 51, 52 and 53 and the three-phase switch 60A, and the other portions are substantially the same as those of the fourth embodiment.

Figure 18:
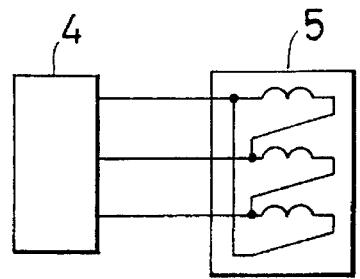
FIG. 18 is a block diagram showing the connection of the windings of the AC motor when the AC motor drives the wheels in the fifth embodiment shown in FIG. 17.
Figure 19:
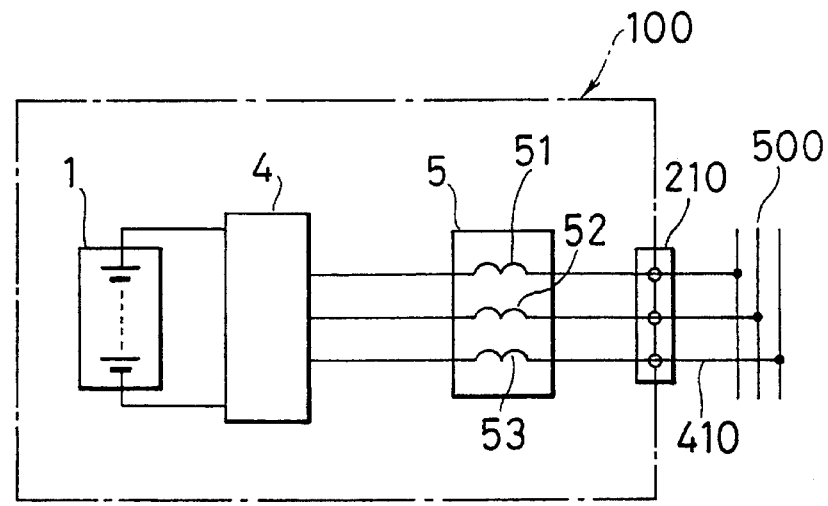
FIG. 19 is a block diagram showing the connection of the windings of the AC motor when the secondary battery is charged through the windings in the fifth embodiment shown in FIG. 17.

FIG. 18 shows the connection when the AC motor 5 drives the wheels in this embodiment, whereas FIG. 19 shows the connection when the secondary battery 1 is charged. Since the operation is similar to that of the first embodiment except that the AC motor 5 is delta-connected during the wheel driving, the description thereof is omitted here.

Figure 20:
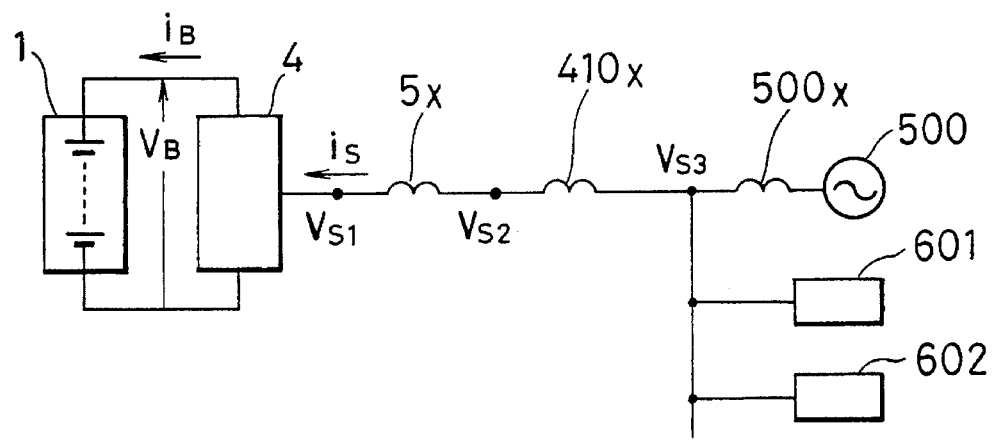
FIG. 20 is an equivalent circuit of the fourth and fifth embodiments shown in FIGS. 14 and 17 during charging of the secondary battery.
Figure 21:
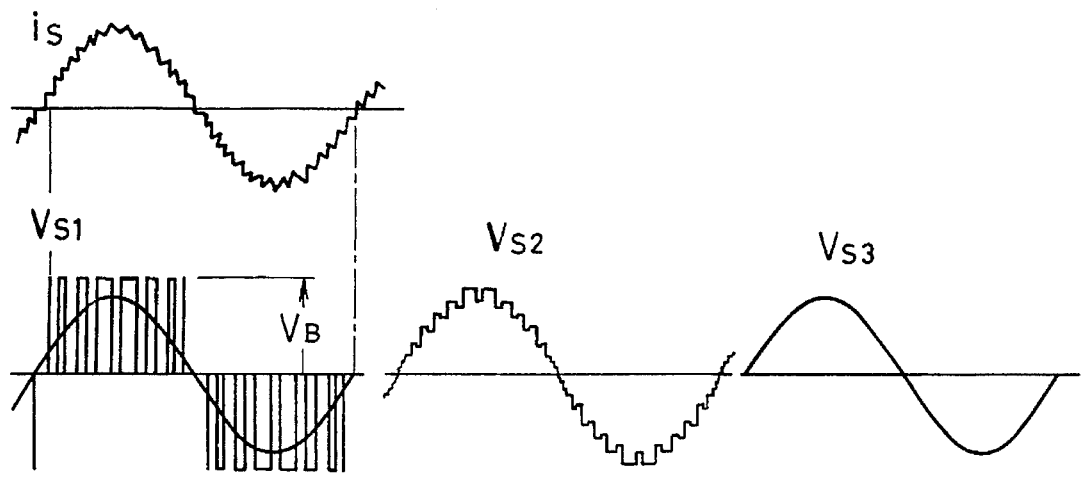
FIG. 21 is a diagram illustrating voltages and current of various portions in the equivalent circuit shown in FIG. 20.

FIG. 20 shows an equivalent circuit during the charging of the secondary battery 1, and FIG. 21 illustrates the waveforms of the current and voltages of various portions.

In FIG. 20, reference numeral 5x designates the reactance of the windings 51, 52 and 53; 410x, the reactance of the cables 410; 500x, the reactance in the distribution network 500; and 601 and 602, other AC loads connected to the distribution network 500. In addition, a character $V_B$ denotes the voltage of the secondary battery 1; $i_B$, the current of the secondary battery 1 during charging; $i_S$, the current at the AC side of the inverter 4 during charging; and $V_S$, the voltage at the AC side of the inverter 4 during charging.

Generally, since the inverter 4 performs PWM control by using a high frequency more than several kHz, the current is supplied from the distribution network 500 becomes a sine-wave including a small amount of high frequency ripples as shown in FIG. 21. Here, the power factor of the sine-wave becomes about 1.0. The voltage at the AC side of the inverter 4 takes a PWM waveform whose peak value is equal to the battery voltage $V_B$ as indicated by $V_{S1}$.

Since the reactance 5x is much larger than the reactance 410x, a large part of the PWM waveform is absorbed by the reactance 5x so that the voltage $V_{S2}$ at the connector 210 of the electric vehicle takes a waveform which is nearly a sine-wave. The voltage at the connector 610 (FIG. 14) on the side of the distribution network 500 further approaches a sine-wave as indicated by $V_{S3}$.

Since the supply voltages to the other AC loads 601 and 602 connected to the distribution network 500 take a substantially sine waveform as $V_{S3}$, the influence of the charging of the electric vehicle 100 on the power supply is nearly zero. As described before, the fourth and fifth embodiments have the phase windings of the AC motor inserted between the external AC power supply and the inverter for driving the AC motor, and charge the secondary battery with the DC current from the inverter which converts the power from the external AC power supply using the reactance of the windings of the AC motor.

In this case, it must be fully ensured that the electric vehicle never starts moving as a result of the torque generated in the motor during charging. This will be discussed in more detail.

Figure 22:
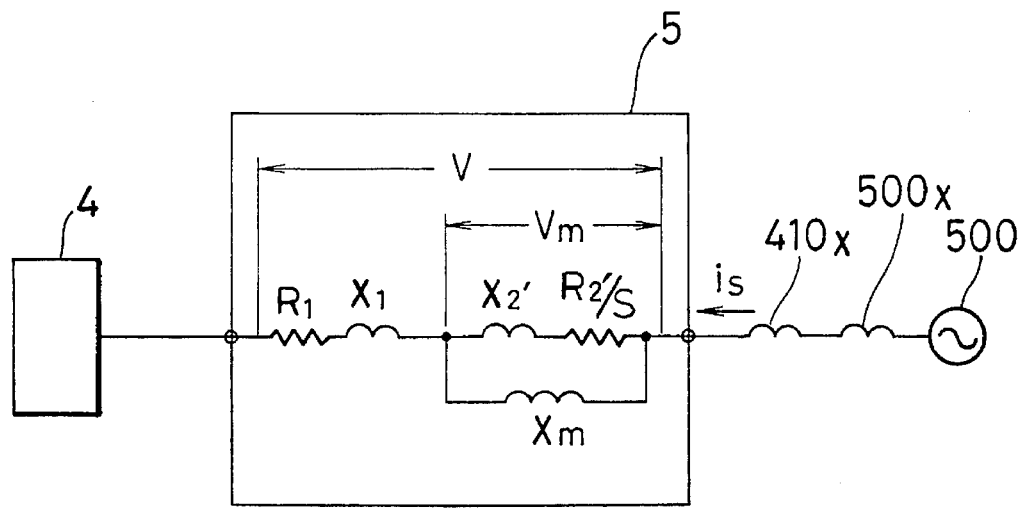
FIG. 22 is an equivalent circuit in charging he secondary battery when an induction motor is employed as the AC motor.

FIG. 22 illustrates an equivalent circuit for charging the secondary battery when an induction motor is employed as the AC motor 5. The equivalent circuit of the AC motor (the induction motor) 5 itself is well-known.

In this figure, $X_1$ and $R_1$ designate the leakage reactance and winding resistance of the stator windings, which generally have a relationship $X_1 \gg R_1$ so that the winding resistance $R_1$ can be neglected. $X_2'$ and $R_2'$ denote the reactance and a resistance of the rotor; S, the slip; Xm, the excitation reactance; V, the voltage applied to the motor 5; and $V_m$, the exciting voltage.

The electric vehicle is stationary while charging the secondary battery 1. In other words, the rotation rate is zero, and hence, the slip S is 1.0. When the slip S=1.0, the relationship $X_1 + X_2' \gg R_2'$ generally holds, and so, $R_2'$ can be neglected.

In addition, the reactance $X_1 + X_2'$ is usually on the order of 10% in terms of % reactance. This means that the voltage V across the motor is about 10% of the rated voltage if the charge current $I_S$ is the rated current of the motor 5. Further, since the reactances $X_1$ and $X_2'$ take a similar value, the exciting voltage Vm becomes about 5% of the rated voltage.

Since the torque generated by the induction motor is proportional to the square of the voltage, the torque developed during charging becomes $(5/100)^2$ or 0.25% of the rated torque. Thus, charging using the windings of the motor produces a small torque which is less than 1% of the rated torque so that there is no possibility that the electric vehicle will start moving. It is preferable, however, to apply the parking brake during charging for the purpose of safety.

As described in the first embodiment with reference to FIG. 10, it is preferable that the charging voltage of the secondary battery 1 be higher than the peak value of the voltage at the AC side of the inverter 4, that is, the peak value of the AC voltage on the distribution network 500. A charging voltage to the secondary battery 1, which is slightly lower than the peak value of the voltage at the AC side of the inverter 4, can be allowed. This is because the internal resistance of the battery will prevent the charging current from growing too large.

Although the circuits for driving the motor and for charging the secondary battery are formed by switching the three-pole switch 60A in the embodiments associated with FIGS. 14 and 17, it is preferable that the circuit for driving the motor be transferred to the circuit for charging by automatically changing the switch when charging is started. This will be accomplished by providing a mechanical structure such that connecting the charging cables 410 to the AC connector 210 enables the switch to automatically operate to transfer the circuits.

It is further preferable that fuses be inserted between the distribution network 500 and the AC side of the inverter 4 for the purpose of protecting the circuit during charging.

In the embodiments as shown in FIGS. 14 and 17, the inverter 4, which has not been conventionally used during charging, can be utilized as an AC-to-DC converter for charging the secondary battery 1. As a result, a low cost, space-saving charging system can be realized.

Moreover, by carrying out the PWM control of the inverter 4, the current is supplied from the distribution network 500 to the electric vehicle 100 during the charging operation can take a nearly complete sinusoidal waveform with small distortion as shown in FIG. 21. This makes it possible to accomplish a charging operation in which the power factor is 1.0. This will also ensure that the integrity of the power on the distribution network 500 is maintained.

Although all the embodiments above are explained assuming that the AC motor is an induction motor, the present invention can be applied to a synchronous motor, as well. In this case, since the torque generated by the synchronous motor during charging is zero, and hence, no torque is generated to drive the electric vehicle, there is no fear that the electric vehicle would start moving.

Although the embodiments of FIGS. 14 and 17 are for the three-phase external power supply such as the distribution network 500, they can also be applied to a single-phase power supply as in the other embodiments.

Although specific embodiments of an electric system for an electric vehicle constructed in accordance with the present invention have been disclosed, it is not intended that the invention be restricted to either the specific configurations or the uses disclosed herein. Modifications may be made in a manner obvious to those skilled in the art. Accordingly, it is intended that the invention be limited only by the scope of the appended claims.

What is claimed is:

1. An electric system for energizing an electric vehicle, said vehicle having a plurality of driven wheels, comprising
   an AC motor for driving at least one of said wheels;
   a secondary battery;
   terminal means for connecting a source of AC power to the electric system;
   power converting means having a DC side coupled to said secondary battery, and an AC side connected to said AC motor and to said terminal means to receive AC power applied thereto, said power converting means converting DC power supplied from said secondary battery to AC power at said AC side to drive said AC motor, said power converting means further rectifying AC power supplied at said terminal means to DC power at the DC side of said power converting means to charge said secondary battery; and
   a switch interposed between said AC motor and the AC side of said power converting means, said switch disconnecting said AC motor from said power converting means during charging of said secondary battery.

2. An electric system for an electric vehicle as claimed in claim 1, wherein said power converting means is an inverter, said inverter including a pulse width modulation charging control circuit for use during charging of said secondary battery.

3. An electric system for an electric vehicle as claimed in claim 1, wherein said AC motor, said power converting means, said switch and said terminal means are three-phase devices.

4. An electric system for an electric vehicle as claimed in claim 1, wherein said AC motor and said power converting means are three-phase devices, and wherein said switch and said terminal means are single-phase devices.

5. An electric system for an electric vehicle as claimed in claim 1, wherein a reactor is connected to said terminal means for maintaining the integrity of current waveforms of said source of AC power.

6. An electric system for an electric vehicle as claimed in claim 1, wherein a step-down transformer is connected to said terminal means for reducing a voltage at which AC power is applied to the AC side of said power converting means.

7. An electric system for an electric vehicle as claimed in claim 6, wherein a peak value of an output voltage of said step-down transformer is set lower than a DC voltage at which DC power is supplied to said secondary battery.

8. An electric system for energizing an electric vehicle, said vehicle having a plurality of driven wheels, comprising
   an AC motor for driving at least one of said wheels, said AC motor having windings therein;
   a secondary battery;
   terminal means for connecting a source of AC power to the electric system;
   power converting means having a DC side coupled to said secondary battery and an AC side connected to said AC motor and to said terminal means to receive AC power applied thereto, said power converting means converting the DC power supplied from said secondary battery to AC power at said AC side to drive said AC motor, said power converting means further rectifying AC power supplied at said terminal means to DC power at the DC side of said power converting means to charge said secondary battery; and
   connection means for interposing the windings of said AC motor between said terminal means and said power converting means during charging of said secondary battery.

9. An electric system for an electric vehicle as claimed in claim 8, wherein said connection means comprises a switch for disconnecting the windings of said AC motor from said terminal means when said power converting means is applying AC power to said AC motor to drive said wheels.

10. An electric system for an electric vehicle as claimed in claim 9, wherein said AC motor is a three-phase motor, and the windings of said AC motor are star-connected during driving of said wheels.

11. An electric system for an electric vehicle as claimed in claim 9, wherein said AC motor is a three-phase motor, and the windings of said AC motor are delta-connected during driving of said wheels.

12. An electric system for an electric vehicle as claimed in claim 9, further comprising means for operating said switch automatically when starting the charging of said secondary battery.

13. An electric system for an electric vehicle as claimed in claim 9 wherein said power converting means is an inverter, said inverter including a pulse width modulation charging control circuit for use during charging of said secondary battery.

14. An electric system for an electric vehicle as claimed in claim 9, wherein said AC motor, said power converting means, said connection means and said terminal means are three-phase devices.

15. An electric system for an electric vehicle as claimed in claim 9, wherein said AC motor and said power converting means are three-phase devices, and said connection means and said terminal means are single-phase devices.

16. An electric system for an electric vehicle as claimed in claim 9 wherein a step-down transformer is connected to said terminal means for reducing a voltage at which AC power is applied to the AC side of said power converting means.

17. An electric system for an electric vehicle as claimed in claim 16, wherein a peak value of an output voltage of said stepdown transformer is set lower than a DC voltage at which DC power is applied to said secondary battery.

* * * * *